United States Patent [19]

Abbott et al.

[11] Patent Number: 4,800,011

[45] Date of Patent: Jan. 24, 1989

[54] FLUID FILTER WITH IMPROVED ELECTRODE AND SPACER CONFIGURATION

[76] Inventors: Woodrow A. Abbott, 2930 Sunnyfield Dr., Whitegate Estates, Merced, Calif. 95340; Leo J. Durossette, 1100 N. Central, Modesto, Calif. 95351

[21] Appl. No.: 76,463

[22] Filed: Jul. 22, 1987

[51] Int. Cl.[4] .......................... B03C 5/02; B03C 3/34; B03C 3/40

[52] U.S. Cl. ................................ 204/302; 204/299 R; 210/748; 55/143; 55/145; 55/146

[58] Field of Search .................. 204/302, 299 R, 186, 204/188, 181.8, 181.9; 210/748; 55/143, 145, 146, 148

[56] References Cited

U.S. PATENT DOCUMENTS

| | | | |
|---|---|---|---|
| 2,849,395 | 2/1958 | Wintermute | 204/305 |
| 2,872,408 | 8/1959 | Waterman et al. | 204/302 |
| 3,252,885 | 5/1966 | Griswold | 204/302 |
| 3,324,026 | 6/1967 | Waterman et al. | 204/302 |
| 3,770,605 | 9/1973 | McCoy | 204/305 |
| 4,054,501 | 5/1977 | Nikitin et al. | 204/302 |
| 4,252,631 | 11/1981 | Hovarongkura et al. | 204/302 |
| 4,302,310 | 10/1981 | Watson et al. | 204/186 |
| 4,454,016 | 6/1984 | Rabinowitz et al. | 204/308 |
| 4,594,138 | 6/1986 | Thompson | 204/302 |

Primary Examiner—John F. Niebling
Assistant Examiner—John S. Starsiak, Jr.
Attorney, Agent, or Firm—Townsend and Townsend

[57] ABSTRACT

A filter utilizing porous filtering media and electrostatic fields to remove particulate matter from dielectric fluids. The electric fields are established by electrodes which are separated by spacers which are of different types so as to allow any desired combination of positive or negative charges on combinations of plates by means of electrical contact or insulation from current-carrying bus bars.

15 Claims, 8 Drawing Sheets

FLUID FILTER WITH IMPROVED ELECTRODE AND SPACER CONFIGURATION

FIELD OF THE INVENTION

The present invention relates generally to apparatus for removing particulate matter from dielectric fluids, and more particularly to a filtering apparatus utilizing an electric field to cause flocculation of the particles.

BACKGROUND OF THE INVENTION

U.S. Pat. No. 4,594,138 to Thompson discloses a fluid filter including a plurality of perforated plate-like electrodes, interleaved with porous filter media, disposed within a housing. A pair of conductive bus bars extend along the outside of the housing, and each makes connection to alternating electrodes via a pin-and-tab arrangement. The bus bars are connected to a suitable voltage source, whereupon fluid flowing through the housing passes through the electrodes and filter media and is subjected to an electric field, directed either parallel or anti-parallel to the direction of flow. The electric field causes the suspended particles to agglomerate or flocculate so that they may be more efficiently captured by the porous filter media. In operation, particles flow over the positive electrodes and begin significant adhering at the negative electrode.

Such fluid filters have proven to be extremely effective in removing particulates from dielectric fluids such as hydraulic fluid. Fluids that would require many passes through conventional filters can be cleaned in one pass through the agglomerating filter.

SUMMARY OF THE INVENTION

This invention is a self-contained, enclosed filter for removing particulate matter from dielectric fluids utilizing porous filter media and an electro-static field which causes the flocculation of particulate matter thereby facilitating their capture by the filter media. The filter construction is simple and is characterized by a high degree of structural integrity with a minimum number of electrical penetrations of the main housing.

More specifically, the filter has a housing with a fluid inlet and a fluid outlet. Inside the housing are first and second current-carrying bus bars and a support rod, all running parallel to one another. The bus bars and support rod are screwed through the lid of the filter and stably seated in the base. Connected to one or the other bus bar are a number of plate-like electrodes which establish electric fields to agglomerate particles in the fluid. The planes of the electrodes are perpendicular to the bus bars. In between the electrodes are porous filter media to trap the agglomerated particles.

Dielectric spacer elements are bored to accommodate the bus bars, and function to separate the electrodes, provide contact or insulation with the bus bars and, in combination with each other, allow any desired arrangement of positively or negatively-charged electrodes. These functions are achieved by means of the spacers acting together with first and second appropriately sized apertures in the electrodes.

The spacers may include some or all of four types. The first type spacer serves to separate the electrodes while allowing electrical contact with the bus bar at the two ends of the spacer. The adjacent electrodes separated by this type spacer thus have the same polarity. The second type spacer has, in addition to the separation portion, a projection which fits through one aperture in the electrode plate to thereby insulate the plate from the bus bar. The third type spacer is like the first type but formed with a cavity sized to accept the projection of the second type spacer element. Electrode plates separated by the combination of second and third type spacers are oppositely charged. The fourth type of spacer has both the projection and the cavity, and in combination with its own type or any of the other three type spacers, provides any desired combination of electrode plate polarities.

The flexibility of electrode plate polarities allows any number of negatively charged plates to be adjacent one to the other. This increases the area of negative charge where the particles agglomerate most efficiently, resulting in larger particles and efficient filtering by the filter medium. Since the spacers are held in place by the bus bars, they stably separate the electrodes and cannot be moved. This is important because the electrodes are subject to the strong turbulent flow of the fluid through the filter. The spacers also serve as simple, convenient, safe, and flexible electrical connections and insulators. These spacers make assembly of the filter simple and efficient since the desired polarity of each plate is achieved by choosing the appropriate spacer and electrode plate and alternately laying one on top of the other. Connections or insulations are made automatically without the need to make holes in the housing and connect up external bus bars. In addition, the electrodes, bus bars, and spacers are all inside the housing thereby minimizing electric shock dangers and obviating puncture holes for electrical connections through which the fluid may leak. The support rod, together with the bus bar/spacers configuration, constitute a rigid skeleton providing optimum structural strength for the entire filter assembly.

In one embodiment of the present invention, the electrodes are disposed such that the plate faces are perpendicular to the flow of the fluid from inlet to outlet. Perforations in the electrodes allow the fluid to pass through. Another embodiment disposes the electrodes such that the plates' faces are parallel to the fluid flow. In these embodiments, the electrodes may be circular, rectangular, cylindrical, or any suitable shape.

For additional electrical shock protection and avoidance of short circuits caused by oil or other fluid build-up on the top of the container, there is provided a cover, adapted to fit over the top of the filter, which also acts to keep the bus bar connections aligned with cables to the voltage source and the fluid outlet aligned with an outlet hose.

A further understanding of the nature and advantages of the present invention may be realized by reference to the remaining portions of this application and the attached drawings.

DESCRIPTION OF THE PREFERRED EMBODIMENTS

Broadly, the present invention is a filter for cleaning dielectric fluids by means of a an electric field which causes the flocculation of particulate matter, thereby facilitating the trapping of particles by a filter medium. The invention comprises a housing enclosing a volume containing plate-like electrodes connected to and charged by two conductive bus bars which establish electric fields between the electrodes. A first set of electrodes is connected to one of the bus bars; a second set to the other. Disposed between the electrodes is a porous material for filtering out particles in the fluid to be cleaned. The fluid enters the enclosure through an inlet, is subjected to an electric field which serves to agglomerate contaminating particles, passes through the filtering medium and through perforations in the electrodes or parallel to the plates, depending on the orientation of the plates, and exists through an outlet. Spacers for separating the electrodes provide either electrical contact between the electrode and a bus bar or insulate the electrode from a bus bar, whichever is desired.

Figure 1:
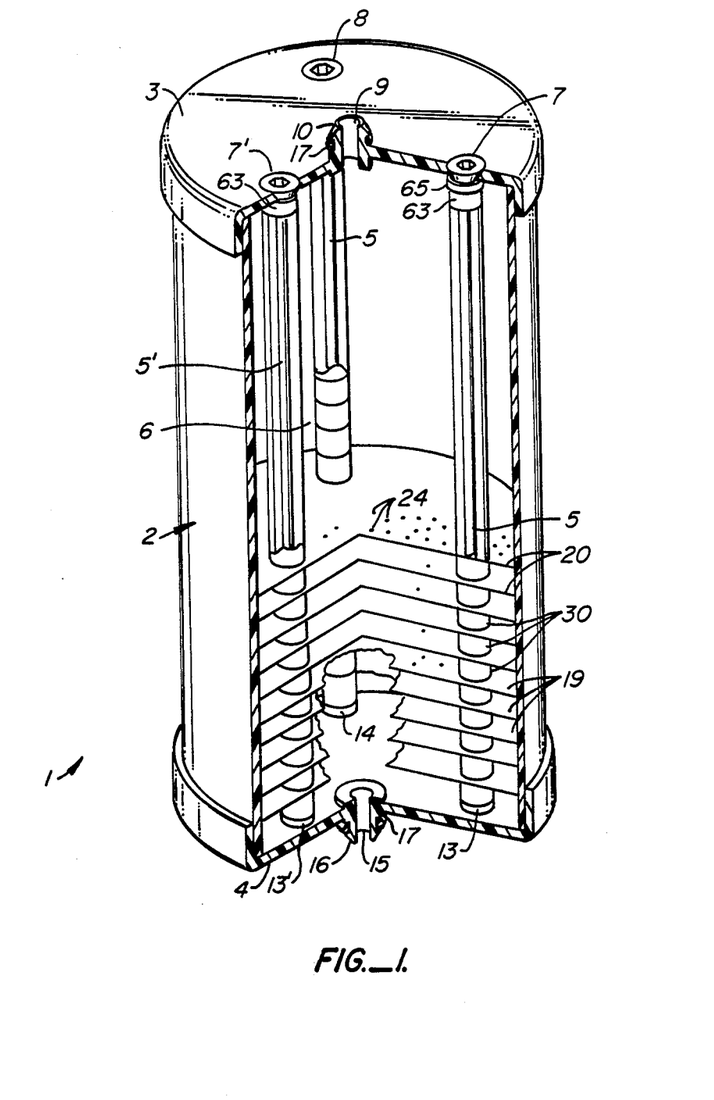
FIG. 1 is a cutaway perspective view of the filter of the present invention.

FIG. 1 is a cutaway perspective view of a filter 1 wherein the electrodes are disposed perpendicular to the direction of fluid flow. There is a dielectric housing 2 defined by a tubular (in this case cylindrical) sidewall, a lid 3 and a base 4. Plate-like electrodes 20 are disposed inside housing 2 and generally parallel to lid 3, base 4, and each other. Electrodes 20 are perforated to allow fluid to pass through and are able to flex. Electrode plates 20 are charged by electrical contact with one or the other of a pair of conductive bus bars 5 and 5'. A non-conductive support rod 6 extends parallel to the bus bars and penetrates the electrodes. The bus bars engage lid 3 with bus bar screws 7 and 7' being available for electrical connection (refer to FIG. 6 for more detail). In a similar manner, support rod 6 engages lid 3, terminating at a support rod screw 8. The inside placement of bus bars 5 and 5' and support rod 6 and their threaded connection to lid 3 and seating in base 4 provide part of a rigid skeleton to structurally support filter 1. Electrodes 20 are spaced apart by spacers 30 (refer to FIGS. 3A–3D for more detail). Lid 3 has an outlet 9 provided by an outlet nipple 10. Cap 4 has bus bar seats 13 and 13', and a support rod seat 14 facing the inside of filter 1, and an inlet 15 provided by an inlet nipple 16. The inlet and outlet nipples are fitted with O-rings 17. Porous pads 19 fill the regions between the electrodes.

For a cylindrical embodiment, a typical size filter is 14 inches in length, 6 inches in diameter, with ⅛ inch spacings between the plates. The housing may be made of any suitable dielectric material, for example, PVC. Bus bars 5 and 5' may be made of any conducting material such as copper, aluminum, or steel. Electrodes 20 may be made of any suitable conducting material such as brass or steel. Porous pads 19 may be made of reticulated polyurethane foam (100 pores/inch is typical).

Figure 2A:
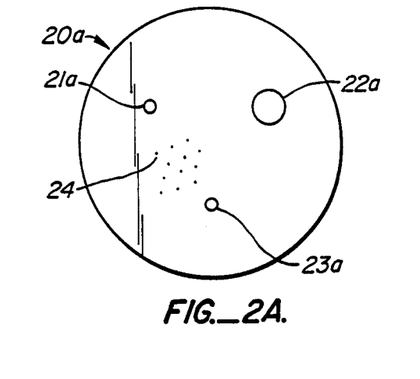
FIGS. 2A-2B show embodiments of circular plate-like electrodes of the present invention.
Figure 2B:
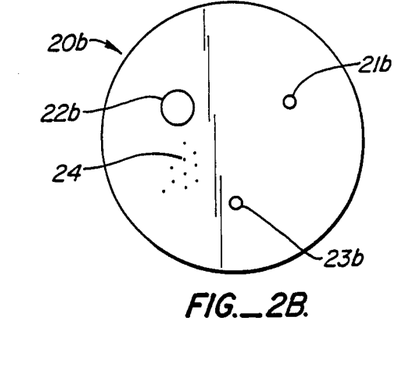

FIGS. 2A–2B show embodiments of the plate-like electrodes 20 of FIG. 1. Each electrode is charged by one or the other, but not both, of oppositely-charged bus bars 5 and 5' (shown in FIG. 1). As shown in FIG. 2A, one set of electrode plates 20a are formed with a first aperture 21a sized to allow bus bar 5 to traverse, but similar in transverse extent to allow ease of contact with bus bar 5, either directly or by means of a conducting contact such as a conductive O-ring. Aperture 21a may be constructed so a spring fit with bus bar 5 is achieved. A second aperture 22a in electrode 20a is larger in size than first aperture 21a to allow a non-conducting cylindrical insert to insulate bus bar 5' from electrode 20a. A third aperture 23a is disposed at a triangularly opposite point to apertures 21a and 22a. Aperture 23a is sized to allow traversal support rod 8, which is made of non-conducting material such as PVC or nylon. The support rod, in combination with bus bars 5 and 5', adds structural rigidity to the entire assembly. The perforations are denoted 24.

As shown in FIG. 2B, a second set of electrodes 20b are formed with apertures 21b and 22b reversed in position relative to electrode 20a to allow an opposite charging of electrode 20b relative to electrode 20a. Thus electrode 20b contacts bus bar 5' and is insulated from bus bar 5. If no differences between electrode faces are required, electrode 20b is just electrode 20a turned over.

In this embodiment, electrodes 20 are circular, perhaps of the order of 6 inches in diameter. Perforations 24 are sized to be the smallest diameter which allows the fluid to flow through the filter at the desired fluid flow rate. Smaller perforations allow a larger charge on the fluid particals to be filtered out. A typical perforation size is 1/16 inch diameter. The insulating insert to the larger aperture is part of spacers 30a–30d which will be described in the following FIGS. 3A–3D.

FIGS. 3A–3D show four types of spacers 30a–30d, made of any non-conducting material, for instance, nylon. All are formed with central bores 32 sized to accommodate the bus bars. Spacers 30a–30d serve to (1) separate electrodes 20 from each other, (2) allow electrical contact between bus bars 5 or 5' and electrodes 20, or (3) insulate bus bars 5 or 5' from electrodes 20. These four different type spacers allow any desired arrangement of positively and negatively-charged electrodes; that is, by stacking combinations of spacers 30a–30d, a given electrode can have either the same charge as the electrode adjacent to it or the opposite charge, whichever is desired.

Figure 3A:
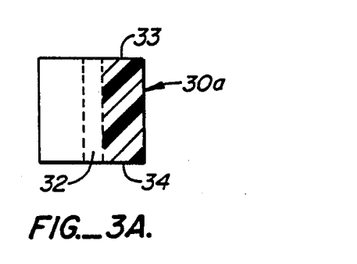
FIGS. 3A-3B show four different types of spacer elements which serve to separate the electrodes and insulate or allow elecrical contact with bus bars above and below the spacer.

FIG. 3A shows a cylindrical (or any other desired shape) non-conducting spacer 30a, having a body with an axial length equal to the desired spacing between adjacent electrodes 20. The principal employment of spacer 30a as far as bus bars 5 and 5' are concerned is to separate adjacent electrodes 20 which are both in electrical contact with the bus bar passing through the spacer. This is easily and conveniently accomplished by spacer 30a because one electrode plate contacts one side 33 of spacer 30a with its aperture 21 coaxial with and proximate spacer bore 32 while the adjacent electrode plate contacts the other side 34 of spacer 30a also with its aperture 21 coaxial with and proximate spacer bore 32. By suitably electrically contacting bus bar 5 with adjacent electrodes 20, they will have the same charge delivered by bus bar 5. A typical embodiment of spacer 30a has an axial extent of ⅛ inch.

The other use of spacers 30a is in conjunction with support rod 6. The spacers are simply placed on the support rod between each pair of adjacent electrodes.

Figure 3B:
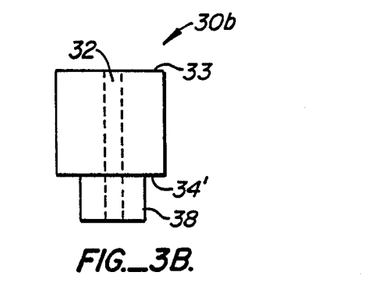

FIG. 3B shows spacer 30b (referred to as a "projecting spacer"), having a body portion and a projecting portion 38 which together define a shoulder 34'. Projecting spacer 30b also has a central bore 32 extending through projecting portion 38.

Figure 3C:
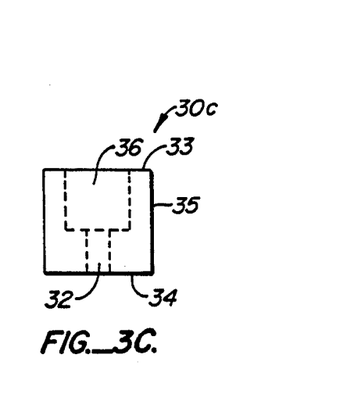

FIG. 3C shows a spacer 30c (referred to as a "receiving spacer"), formed with a receptacle cavity 36 extending partially through spacer 30c and coaxial with central bore 32. Receptacle cavity 36 is sized to allow the insertion of projecting portion 38 of projecting spacer 30b with the central bores 32 coaxially aligned.

Figure 3D:
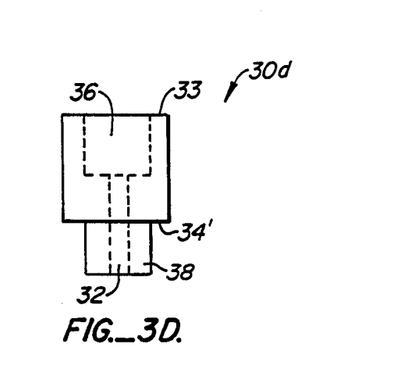

FIG. 3D shows a spacer 30d (referred to as a "receiving/projecting spacer") formed with central bore 32, receptacle cavity 36, and projecting portion 38. Receiving/projecting spacer 30d works in combination with either another receiving/projecitg spacer or a projecting spacer on side 33, and either another receiving/projecting spacer or a receiving spacer proximate shoulder 34'.

Figure 4A:
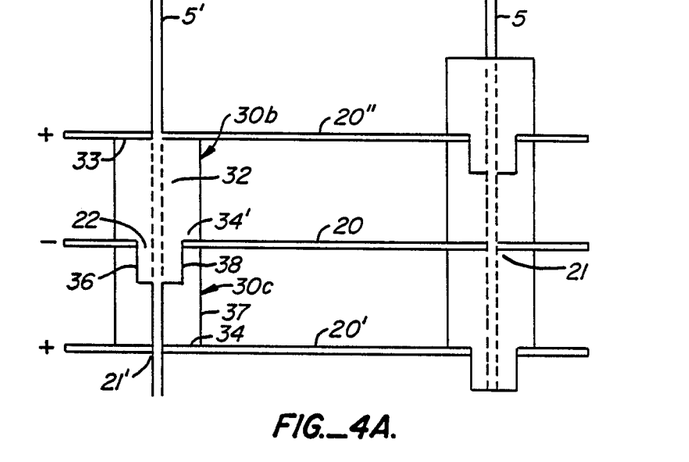
FIGS. 4A-4C show combinations of different type spacers.

FIG. 4A shows the spacers used to arrange electrodes 20'', 20, and 20' in a (+- +) configuration, projecting portion 38 is inserted through larger aperture 22 of electrode plate 20. Bus bar 5' (in this example) traverses central bore 32. Projecting portion 38 insulates electrode plate 20 from bus bar 5' thus preventing bus bar 5' from imparting its charge to electrode plate 20. Then projecting portion 38 is inserted into receptacle cavity 36 and electrode plate 20 is thus separated from its adjacent electrode plate by receiving spacer 30c. Side 34 of receiving spacer 30c has no projecting portion so an adjacent electrode 20' may easily contact bus bar 5' by any suitable means and thus electrode 20' will have a charge imparted to it by bus bar 5'. Thus a combination of projecting spacer 30b and receiving spacer 30c results in a first electrode 20'' proximate side 33 of projecting spacer 30b having a charge imparted by bus bar 5'; a second elecrode plate 20 proximate shoulder 34' of projecting spacer 30b is insulated from bus bar 5' so it will have an opposite charge imparted it by bus bar 5 contacting through second smaller aperture 21; a third electrode plate 20' proximate side 34 of receiving spacer 30c conveniently contacts bus bar 5' by means of smaller aperture 21' of electrode plate 20' and thus has a charge opposite that of adjacent electrode plate 20 (which is charged by bus bar 5), but the same as that of the next adjacent electrode plate 2'' (which is charged by bus bar 6).

Figure 4B:
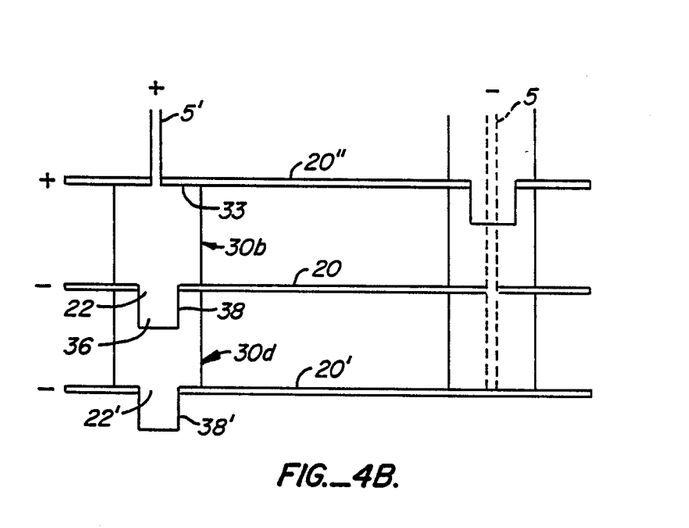

FIG. 4B shows the combination of receiving/projecting spacer 30d and projecting spacer 30b used to provide a (+ - -) configuration. Projecting portion 38 of projecting spacer 30b traverses larger aperture 22 of electrode plate 20 and inserts into receptacle cavity 36 of receiving/projecting spacer 30d, thereby insulating electrode plate 20 from bus bar 5' (for this example). Thus electrode plate 20 has a charge imparted by bus bar 5. Projecting portion 38' of receiving/projecting spacer 30d traverses larger aperture 22' of electrode plate 20', thereby insulating electrode plate 20' from bus bar 5' also, whereupon electrode plate 20' has the same charge as electrode plate 20. Electrode plate 20'' proximate side 33 of projecting spacer 30b is charged by bus bar 5' (since there is no insulating projecting portion or receptacle cavity), whereupon electrode plate 20'' will have an opposite charge from that of electrodes 20 and 20'.

Figure 4C:
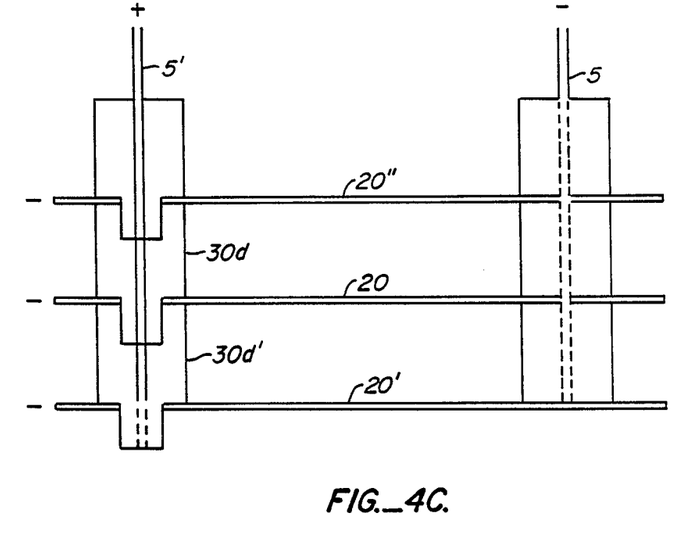

FIG. 4C shows the combination of receiving/projecting spacer 30d with another receiving/projecting spacer 30d' to provide a (— — —) configuration. The lower half of the arrangement is the same as that shown in FIG. 4B, but here receiving-projecting spacer 30d may have a third electrode plate 20'' insulated from bus bar 5' and thus with a charge the same as that of electrodes 20 and 20'.

The flexibility achieved with the four different type spacers 30a–30d and the inside placement of bus bars 5 and 5' results in efficient assembly of filter 1 which takes approximately one-third of the time required to assemble a filter of the Thompson variety. The different type spacers 30a–30d allow many different arrangements of charged electrodes. This will be made clearer with regard to the next figure.

Figure 5:
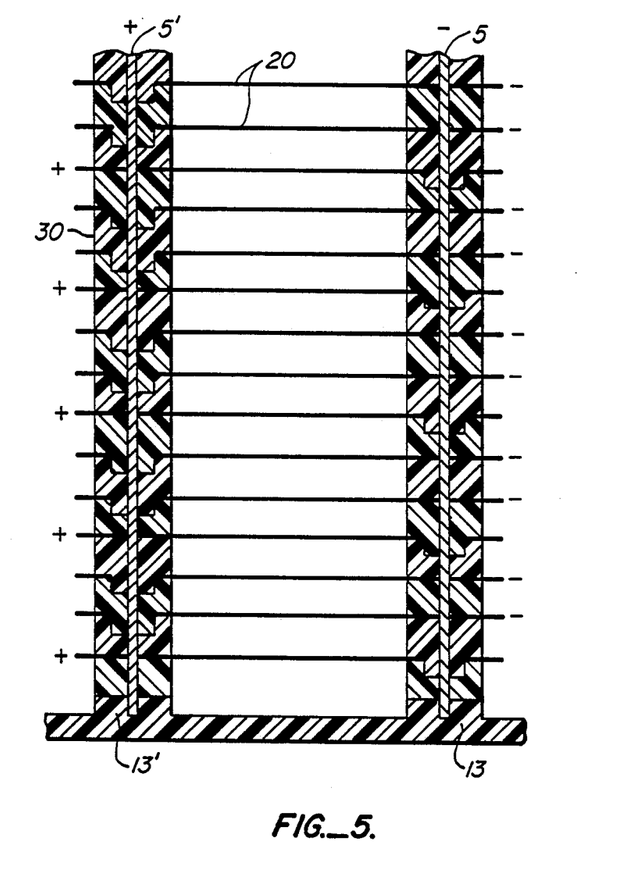
FIG. 5 shows schematically two sets of spacers and electrodes connected by bus bars.

FIG. 5 shows schematically two stacks of spacers 30 and electrodes 20 connected by bus bars 5 and 5'. The "x" in the figure denotes electrical contact. The arrangement of spacers 30 in this embodiment are such that there are positive plates separated by two. negative plates. Of course, any desired arrangement is possible, as shown by the various combinations shown in FIGS. 4A–4C. Note that electrical contact or insulation with the first bus bar determines that the opposite must be true for that particular electrode plate with regard to the second bus bar. The capability of having the same polarity plates adjacent each other allows a larger region of negative charge. Particles agglomerate at negatively charged areas so the flocculation process is more efficient with more negatively charged plates.

Although FIG. 5 shows all four spacer types used to achieve the desired configuration, it is generally possible to achieve any configuration with only two types. It will be appreciated that spacer elements 30a and 30b are in some sense redundant, since spacer elements 30c and 30d can substitute for them. In such cases, the cavities in the substitute spacers would not be filled by corresponding projections. The viability of using only the two types will depend on the manner in which electrical connection is made between the electrode and bus bar. If contact relies on compression of a conductive O-ring, the extra cavities may be detrimental.

Figure 6:
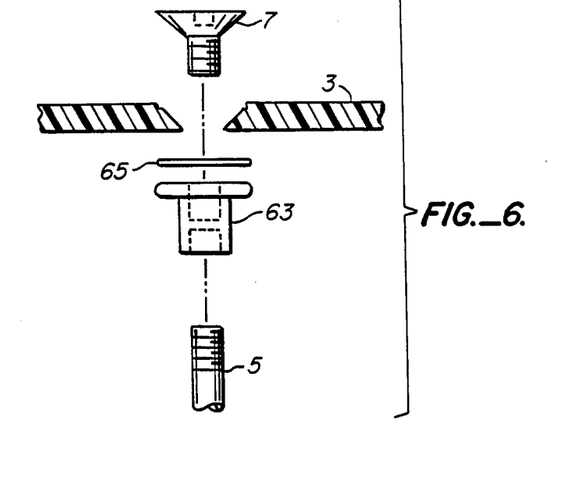
FIG. 6 shows a detailed view of the attachment of a bus bar to a filter lid.

FIG. 6 shows a detailed view of the attachment of bus bar 5 to housing lid 3 and the electrical connection of bus bar 5 to bus bar screw 7. Bus bar 5 and bus bar screw 7 engage opposite ends of an internally threaded post 63. Post 63 is formed with a flange that operates to compress an O-ring or washer 65 to form a liquid-tight seal. This construction allows bus bars 5 and 5' to be disposed inside of housing 2 and still make possible electrical contact through bus bar screws 7 and 7' at the outside of lid 3. The aperture in lid 3 through which bus bar screw 7 passes is preferably countersunk so that the screw sits slightly below the lid surface. The screw is preferably configured to accept an Allen-key or the like. In addition to charging electrodes 20, bus bars 5 and 5' provide effective structural rigidity to the filter assembly. Bus bars 5 and 5' may be partially threaded as shown in the figure or threaded their entire length. The connection of support rod may be effected in the same manner as for the bus bars. There is, however, a greater degree of flexibility since electrical penetration of the housing is not a consideration.

Figure 7:
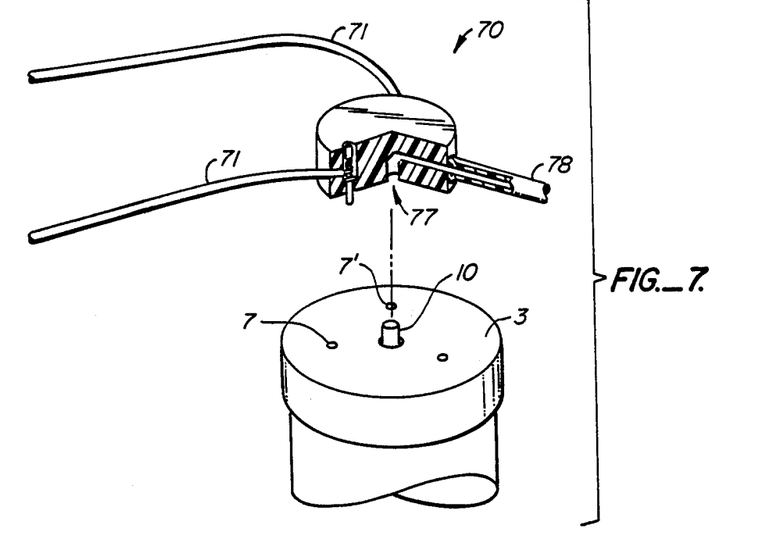
FIG. 7 shows the outside of the filter and a cover.

FIG. 7 shows an embodiment of a connecting cover 70 adapted to fit over lid 3 and provide electrical connections to the filter. A pair of insulated cables 71, suitable for connection to an external voltage source lead into the connecting cover and are coupled to downwardly facing spring-loaded contacts 75. Connecting cover 70 protects operators from electrical shock by covering bus bar screws 7 and 7'. An axial bore 77 extends partway up connecting cover 70 and fits over outlet nipple 10. The bore communicates with an outlet hose 78 and directs the filtered fluid away from the filter. This arrangement prevents filtered fluid from pooling on lid 3 and perhaps causing short circuits. Connecting cover 70 is preferably a phenolic block. The spring-loaded contacts make positive connection to bus bar screws 7 and 7' when connecting cover 70 is clamped down with its bore seated on outlet nipple 10. Proper angular alignment is provided by the recessed mounting of the bus bar screws, or by any other suitable keyed arrangement.

Returning to FIG. 1 in operation, fluid to be filtered enters filter 1 through inlet 15. Electrode plates 20 are charged at a voltage sufficient to achieve efficient agglomeration of particles. Representative voltages used have been in the range of 9,500 to 15,000 volts. It has been found that with a ⅛ inch electrode plate separation, short circuits develop at 10,000 volts. In general, operating voltages are determined by the plate separation. A typical one-pass filtering run results in fluid of 6/3 purity using the international standard.

Figure 8:
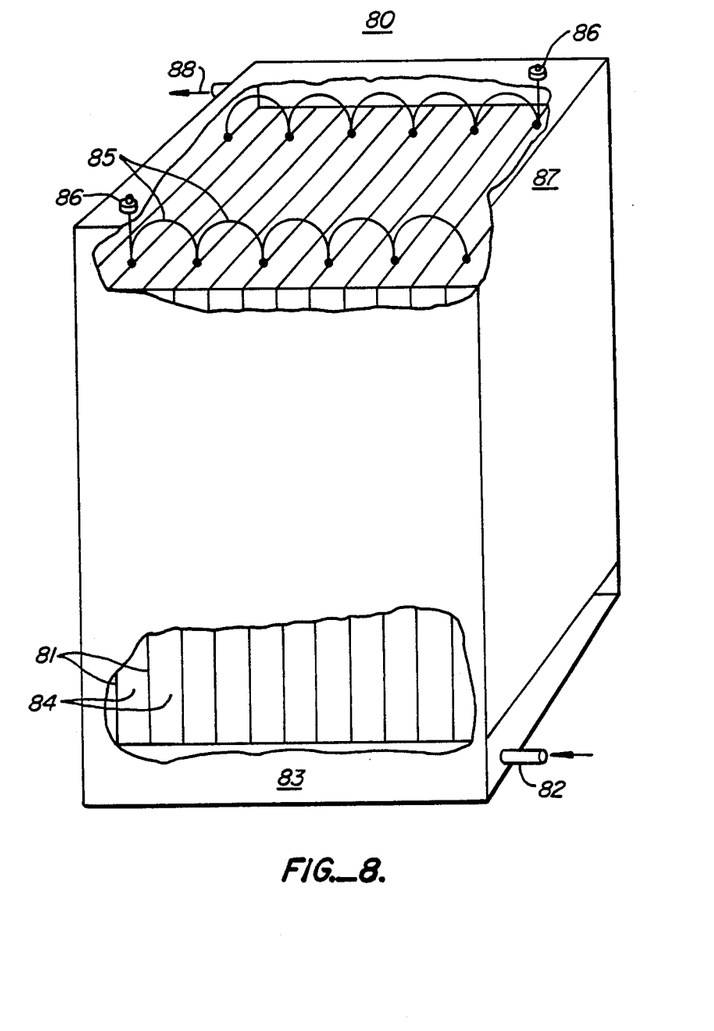
FIG. 8 is a schematic view of the present invention in a rectangular electrode configuration.

FIG. 8 shows a schematic perspective view of a filter 80 in an embodiment wherein the electrodes 81 are rectangular and disposed such that the plate faces are parallel to the direction of fluid flow. Fluid enters an inlet 82, accumulates in a bottom reservoir 83, and then flows through filtering media 84 parallel to electrodes 81 where it is subjected to an electric field. The field is established by electrical connections, shown schematically as 85, to electrodes 81 and contacts 86 which are connected to voltage sources. Filtered fluid accumulates in a top reservoir 87 and exits through an outlet 88. The filtration principles are the same as for the embodiments discussed above.

Figure 9:
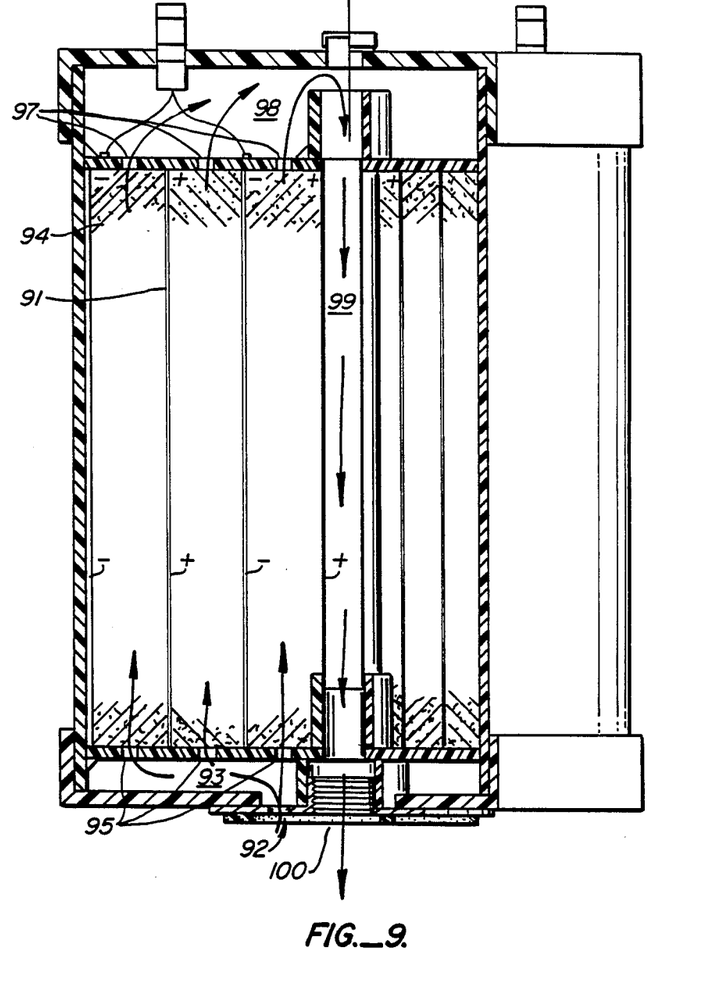
FIG. 9 is a cutaway view of the present invention in a cylindrical electrode configuration.

FIG. 9 shows a cutaway view of a cylindrical filter 90 in an embodiment wherein the fluid flow is parallel to electrodes 91, but enters and exits at the bottom side for adaptation to spin-on filters for vehicles. In this embodiment, fluid enters at a bottom inlet 92 into a reservoir 93 and thence through subinlets 96 after which it is subjectd to an electric field established by cylindrical electrodes 91 which are charged by conducting connections 95 connected to one or the other of electrical contacts 96. The fluid is filtered by filtering media 94 and exits through sub-outlets 97 into a reservoir 98 and down a central tube 99 to exit through an outlet 99. The filtration principles are the same as for the embodiments discussed above. In one embodiment of spin-on filter 90, the cylinder length is 8 inches, the diameter is 6 inches, the electrode separation is ⅛ inch, and the central tube is ⅝ inch diameter. Reservoirs 93 and 98 are shown to scale with respect to the other dimensions. Spin-on filter 90 is generally sized for adaptability for vehicles of all kinds.

While the above description provides a full and complete description of the preferred embodiments of the present invention, various modifications, alternate constructions and equivalents may be employed.

For example, a simplified but less flexible variant, suitable for use only with alternating (+ − + −etc.) polarities, could be implemented essentially using only spacer elements having projecting portions equal in length to the body portions, with retention of the electrodes on the shoulders being provided with spring clip retaining rings. A spacer element of the first type would also be needed at the top and bottom.

Therefore, the above description and illustrations should not be construed as limiting the scope of the invention which is defined by the following claims.

We claim:

1. A filter for removing particles from fluids comprising:
   a housing defining a chamber and formed with an inlet and an outlet;
   a plurality, including first and second sets, of plate-like electrodes disposed within said chamber and arranged in spaced parallel relationship;
   a plurality of porous filter media disposed between said electrodes in said chamber so that fluid flowing from said inlet to said outlet passes through said porous filter media and through the regions between adjacent ones of said electrodes;
   first and second conductive bus bars, each having a respective cross section, said bus bars extending generally perpendicular to said electrodes;
   each of said first set of electrodes being formed with first and second apertures, said first aperture being sized to correspond to the cross section of said first bus bar, said second aperture being larger than the cross section of said second bus bar;
   each of said second set of electrodes being formed with first and second apertures, said first aperture being sized to correspond to the cross section of said second bus bar, said second aperture being larger than the cross section of said first bus bar;
   said electrodes being disposed with said first bus bar passing through the respective first apertures of said first set of electrodes and through the respective second apertures of said second set of electrodes; and
   a plurality, including at least two types, of dielectric spacer elements associated with said first bus bar;
   each of said spacer elements having a body portion formed with a bore sized to accommodate said first bus bar, said body portion having an axial extent corresponding to a separation distance between adjacent electrodes and having a transverse cross section larger than the second apertures of said second set of electrodes;
   each of at least one of said types of said spacer elements further having a projecting portion formed with a bore sized to accommodate said frist bus bar, said projecting portion having a cross section commensurate with the second apertures of said second set of electrodes, thereby defining a shoulder between the body portion and the projecting portion;
   each of at least another of said types of said spacer elements having its body portion formed with a cavity opening towards one end of the spacer element and acting to enlarge the bore of the spacer element, said cavity being sized to allow insertion of the projecting portion of another spacer element;
   said spacer elements being axially aligned, with said first bus bar passing through the respective bores of said spacer elements so as to permit electrical contact between said first bus bar and said first set of electrodes, and with said projecting portions of said spacer elements passing through the respective second apertures of said second set of electrodes so as to prevent electrical contact between said first bus bar and said second set of electrodes.

2. The filter of claim 1 wherein said bus bars and said spacer elements are circular in cross section.

3. The filter of claim 1 wherein said electrodes are perforated and disposed across the flow path of fluid flowing through said chamber.

4. The filter of claim 1 wherein said electrodes are disposed parallel to the flow path of fluid flowing through said chamber.

5. The filter of claim 1 wherein said electrodes are circular plates.

6. The filter of claim 1 wherein said electrodes are rectangular plates.

7. The filter of claim 1 wherein adjacent ones of said electrodes are electrically connected to opposite ones of said first and second bus bars.

8. The filter of claim 1 wherein at least some adjacent ones of said electrodes are electrically connected to the same bus bar.

9. The filter of claim 1 wherein said housing is cylindrical and said bus bars are disposed equidistantly from the axis of said housing.

10. The filter of claim 1, wherein each of said electrodes is formed with a third aperture, and further comprising:
a support bar being disposed inside said chamber and extending generally perpendicular to said electrodes through said third apertures, thereby, together with said bus bars, providing structural support to said electrodes.

11. The filter of claim 10 wherein said housing comprises:
an open-ended tubular wall;
a lid overlying a first open end of said wall and formed with said outlet; and
a base overlying a second open end of said wall and formed with said inlet and first, second and third receptacle seats;
said bus bars and support rod being attached to said lid at respective first ends and seated in respective ones of said receptacle seats in said base at respective second ends.

12. The filter of claim 1 wherein:
said dielectric spacer elements include first, second, third, and fourth types;
each of said first type of spacer elements has neither a projecting portion nor a cavity;
each of said second type of spacer elements has a projecting portion but no cavity;
each of said third type of spacer elements has a cavity but no projecting portion; and
each of said fourth type of spacer elements has a projecting portion and a cavity.

13. A filter for removing particles from fluids comprising:
a housing defining a chamber and formed with an inlet and an outlet;
a plurality, includiing first and second sets, of plate-like electrodes disposed within said chamber and arranged in spaced parallel relationship;
a plurality of porous filter media interleaved between said electrodes in said chamber so that fluid flowing from said inlet to said outlet passes through said porous filter media and through the regions between adjacent ones of said electrodes;
first and second conductive bus bars, each having a respective cross section, said bus bars extending generally perpendicular to said electrodes;
each of said first set of electrodes being formed with first and second apertures, said first aperture being sized to correspond to the cross section of said first bus bar, said second aperture being larger than the cross section of said second bus bar;
each of said second set of electrodes being formed with first and second apertures, said first aperture being sized to correspond to the cross section of said second bus bar, said second aperture being larger than the cross section of said first bus bar;
said electrodes being disposed with said first bus bar passing through the respective first apertures of said first set of electrodes and through the respective second apertures of said second set of electrodes; and
a plurality of dielectric spacer elements associated with said first bus bar;
each of said spacer elements having a body portion formed with a bore sized to accommodate said first bus bar, said body portion having an axial extent corresponding to a separation distance between adjacent electrodes and having a transverse cross section larger than the second aperturs of said second set of electrodes;
each of at least some of said spacer elements further having a projecting portion formed with a bore sized to accommodate said first bus bar, said projecting portion having a cross section commensurate with the second apertures of said second set of electrodes, thereby defining a shoulder between the body portion and the projecting portion;
said spacer elements being axially aligned, with said first bus bar passing through the respective bores of said spacer elements so as to permit electrical contact between said first bus bar and said first set of electrodes, and with said projecting portions of said spacer elements passing through the respective second apertures of said second set of electrodes so as to prevent electrical contact between said first bus bar and said second set of electrodes.

14. The filter of claim 1 wherein said electrodes are disposed with said second bus bar passing through the respective second apertures of said first set of electrodes and through the respective first apertures of said second set of electrodes, and further comprising an additional plurality of dielectric spacer elements associated with said second bus bar;
said additional plurality of spacer elements being axially aligned, with said first bus bar passing through the respective bores of said second plurality of spacer elements, said second plurality of spacer elements preventing electrical contact between said second bus bar and said first set of electrodes while permitting electrical contact between said second bus bar and said second set of electrodes.

15. A filter for removing particles from fluids comprising:
a housing defining a chamber formed with an inlet and an outlet;
a plurality of plate-like electrodes disposed within said chamber and arranged in spaced parallel relationship;
a plurality of porous filter media disposed between said electrodes in said chamber so that fluid flowing from said inlet to said outlet passes through said porous filter media and through the regions between adjacent ones of said electrodes;

first and second conductive bus bars having a circular transverse cross section characterized by a bus bar diameter, said bus bars extending generally perpendicular to said electrodes;

each of said plurality of electrodes being formed with a first aperture having a diameter corresponding to the bus bar diameter and a second aperture having a diameter larger than the bus bar diameter;

said electrodes being disposed with said first bus bar passing through the respective first apertures of a first set of said electrodes and through the repsective second apertures of a second set of said electrodes, and said second bus bar passing through the respective first apertures of said second set of said electrodes and through the respective second apertures of said first set of said electrodes; and a plurality of dielectric spacer elements, each having a cylindrical body portion of diameter greater than the diameter that characterizes said second apertures, said body portion being formed with an axial bore having an internal diameter no less than said bus bar diameter;

at least some of said spacer elements further having a cylindrical projecting portion of a diameter sized to pass through said second apertures of said electrodes, said projecting portion being coaxially disposed on one end of its associated spacer element and being formed with a bore having a diameter no less than said bus bar diameter;

at least some of said spacer elements having their body portions each formed with a cavity opening toward one side of the spacer element and acting to enlarge the bore of the spacer element, said cavity being sized to allow insertion of the projecting portion of those spacer elements having such a projecting portion;

at least some of said elements having at least one end which is characterized by neither a projecting portion nor a cavity;

said spacer elements being axially aligned with said bus bars passing through the respective bores of said spacer elements, with the projecting portions of said spacer elements passing through the respective second apertures of said electrodes.

* * * * *